(12) United States Patent
Zacher

(10) Patent No.: US 10,587,017 B2
(45) Date of Patent: Mar. 10, 2020

(54) BATTERY MODULES HAVING A PLURALITY OF SUBMODULES

(71) Applicant: Dr. Ing. h.c. F. Porsche Aktiengesellschaft, Stuttgart (DE)

(72) Inventor: Marcus Zacher, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 202 days.

(21) Appl. No.: 15/877,753

(22) Filed: Jan. 23, 2018

(65) Prior Publication Data
US 2018/0212286 A1 Jul. 26, 2018

(30) Foreign Application Priority Data

Jan. 24, 2017 (DE) .......................... 10 2017 101 274

(51) Int. Cl.
*H01M 10/613* (2014.01)
*H01M 2/10* (2006.01)
(Continued)

(52) U.S. Cl.
CPC ....... *H01M 10/613* (2015.04); *H01M 2/1077* (2013.01); *H01M 2/206* (2013.01);
(Continued)

(58) Field of Classification Search
CPC ... H01M 10/613; H01M 2/1077; H01M 2/206
See application file for complete search history.

(56) References Cited

U.S. PATENT DOCUMENTS

| 8,615,869 B2 | 12/2013 | Chattot |
| 2011/0302773 A1 | 12/2011 | Chattot |

(Continued)

FOREIGN PATENT DOCUMENTS

| DE | 102009057368 A1 | 6/2011 |
| DE | 102014217188 A1 | 3/2015 |

(Continued)

OTHER PUBLICATIONS

Notification of Reason for Rejection for Japanese Application No. 2018-008557, dated Feb. 5, 2019, 3 pages.

(Continued)

*Primary Examiner* — Matthew J Merkling
(74) *Attorney, Agent, or Firm* — RatnerPrestia

(57) ABSTRACT

A battery module, in particular for a battery for driving a vehicle, having a plurality of individual stackable battery cells, and two module end plates. The battery cells are stacked and held between the two module end plates. The battery cells are electrically coupled to one another, and the two module end plates are electrically coupled to the battery cells and each have an electrical contact for connection of the battery module. The battery module has at least one intermediate element, each intermediate element being electrically coupled to adjacent battery cells. Each intermediate element divides the battery module into a plurality of submodules, and each intermediate element electrically connects the submodules. Also described is a battery, in particular for driving a vehicle, having a plurality of the abovementioned battery modules, as well as a vehicle having an electric drive and an abovementioned battery.

7 Claims, 6 Drawing Sheets

(51) Int. Cl.
 *H01M 10/625* (2014.01)
 *H01M 2/20* (2006.01)
 *H01M 10/6555* (2014.01)
 *H01M 10/615* (2014.01)

(52) U.S. Cl.
 CPC ....... *H01M 10/615* (2015.04); *H01M 10/625* (2015.04); *H01M 10/6555* (2015.04); *H01M 2220/20* (2013.01); *Y02T 10/7005* (2013.01)

(56) References Cited

U.S. PATENT DOCUMENTS

| | | |
|---|---|---|
| 2012/0156537 A1 | 6/2012 | Meintschel et al. |
| 2012/0295143 A1 | 11/2012 | Schaefer |
| 2014/0097797 A1 | 4/2014 | Hendrix et al. |
| 2015/0017504 A1* | 1/2015 | Isshiki ................. B60L 3/0046 429/120 |
| 2015/0214531 A1* | 7/2015 | Sun .................... H01M 2/1077 429/120 |
| 2016/0141712 A1* | 5/2016 | Choi ................... H01M 2/1016 320/109 |
| 2018/0026243 A1* | 1/2018 | Stojanovic .............. B60L 58/21 429/99 |

FOREIGN PATENT DOCUMENTS

| | | |
|---|---|---|
| DE | 102014017081 A1 | 5/2016 |
| EP | 1548912 A1 | 6/2005 |
| JP | 2006278263 A | 10/2006 |
| JP | 2012515421 A | 7/2012 |
| KR | 20110089443 A | 8/2011 |
| WO | 2012158185 A1 | 11/2012 |

OTHER PUBLICATIONS

German Search Report for German Application No. 10 2017 101 274.5, with English translation, dated Oct. 26, 2017—9 Pages.
English translation of Korean Notice of Preliminary Rejection for Korean Application No. 10-2018-0006888, dated Apr. 19, 2019, 5 pages.

* cited by examiner

BATTERY MODULES HAVING A PLURALITY OF SUBMODULES

CROSS-REFERENCE TO RELATED APPLICATIONS

This application claims priority to German Patent Application No. DE 10 2017 101 274.5, filed Jan. 24, 2017, which is incorporated by reference herein in its entirety.

FIELD OF THE INVENTION

The present invention relates to a battery module, in particular for a battery for driving a vehicle, having a plurality of individual stackable battery cells, two module end plates, wherein the battery cells are stacked and held between the two module end plates, the battery cells are electrically coupled to one another, and the two module end plates are electrically coupled to the battery cells and each have an electrical contact for connection of the battery module.

The present invention relates furthermore to a battery, in particular for driving a vehicle, having a plurality of the above battery modules.

The present invention moreover relates to a vehicle having an electric drive and an above battery.

BACKGROUND OF THE INVENTION

Battery modules are used, for example, in automotive engineering to supply power for a drive of electric vehicles. In this case, the vehicles may be both vehicles that have exclusively an electric drive, usually referred to as electric vehicles, or vehicles that have a further drive, typically a conventional drive in the form of a combustion engine, in addition to an electric drive. The latter vehicles are often referred to as hybrid vehicles.

Batteries with a high storage capacity are required for the electric drive, said batteries additionally being as small and as light as possible and being able to supply both high voltages and large currents. A plurality of battery modules are therefore usually used in the batteries, said battery modules in turn being formed from a plurality of individual battery cells. The battery cells are normally connected in series in the battery modules, with the result that the voltages of the individual cells add up to form a module voltage. The battery modules can be interconnected in series and/or in parallel in the battery according to requirements.

To adapt a battery module to a specific number of battery cells, a high degree of complexity is usually required. Typically, the battery module has to be disassembled and then reassembled again to obtain the desired battery module. This is disadvantageous, particularly in areas where a high degree of modularization and an ability to adapt to changing peripheral conditions are required, for example in the field of stationary batteries. It is therefore desirable to be able to reconfigure battery modules in a simple and cost-effective manner.

In addition to the adaptation to changed requirements, simple maintenance and repair of batteries and battery modules are also desirable. Until now, it has also been necessary in this case to completely disassemble the battery modules to be able to replace individual, damaged battery cells, for example.

Furthermore, good structural integrity in the battery modules is important. Battery modules having a large number of individual battery cells can only partly fulfill these requirements with some difficulty.

FIG. 1 illustrates a battery module 10 from the prior art in an exemplary manner. The battery module 10 comprises two module end plates 12, between which a plurality of individual stackable battery cells 14 are arranged. The battery cells 14 are stacked accordingly and held between the two module end plates 12. On each of the two module end plates 12, a screw terminal 16 is formed as an electrical contact for connection of the battery module 10. Furthermore, the two module end plates 12 each have a terminal element 18 for electrical coupling to the respectively adjacent battery cell 14. The battery cells 14 are electrically coupled to one another by means of coupling elements 20.

In this connection, DE 10 2014 217 188 A, which is incorporated by reference herein, discloses a battery module having a structure for preventing coolant and ventilation gas from mixing together. Furthermore, a battery module that has two or more stacked battery cells, which can be charged and discharged, and cartridges for fixing the corresponding battery cells for the purpose of forming a battery stack is known. Each of the cartridges has a cooling fin, which is in contact with the battery cells, and a cartridge frame for fixing the cooling fin. The cooling fin comprises two cooling plates, the two cooling plates in one state being coupled to each of the cartridge frames, in which the cooling plates are spaced apart from one another, in order to define a coolant flow channel. Each of the cartridges is provided with openings, which communicate with the coolant flow channel between the cooling plates. Furthermore, a sealing element is provided to insulate a space, which is defined between the cartridge frame and the battery cells, from the coolant flow channel at a stack interface between a cartridge and an adjacent cartridge.

SUMMARY OF THE INVENTION

Proceeding from the abovementioned prior art, described herein is a battery module of the type mentioned above, a battery of the type mentioned above and a vehicle of the type mentioned above, which allow a simple configuration of battery cells to form battery modules and batteries, which can be easily adapted to changed requirements, which allow simple maintenance and repair of batteries and battery modules and provide batteries and battery modules with good structural integrity.

In accordance with the invention, a battery module is therefore specified, in particular for a battery for driving a vehicle, said battery module having a plurality of individual stackable battery cells, two module end plates, wherein the battery cells are stacked and held between the two module end plates, the battery cells are electrically coupled to one another, and the two module end plates are electrically coupled to the battery cells and each have an electrical contact for connection of the battery module, wherein the battery module has at least one intermediate element, each intermediate element is electrically coupled to adjacent battery cells, each intermediate element divides the battery module into a plurality of submodules, and each intermediate element electrically connects the submodules.

In accordance with the invention, a battery is furthermore specified, in particular for driving a vehicle, said battery having a plurality of the above battery modules.

In accordance with the invention, a vehicle having an electric drive and an above battery is moreover specified.

Described herein is a modular and easily scalable design of individual battery modules by way of said module construction having submodules. In this case, an intermediate element as a whole is respectively part of two adjacent submodules. At the same time, the stability of the battery modules is improved overall by the intermediate elements. Moreover, said battery modules are simple and cost-effective to assemble as well as to maintain and repair. Electrically connecting the submodules by means of the intermediate elements dispenses with an otherwise, possibly required, separate busbar that would have to be connected to the individual submodules. The number of required electrical contacts can accordingly be reduced.

A battery module in accordance with the present invention therefore fundamentally comprises two module end plates, which electrically contact adjacent battery cells. The module end plates are preferably accordingly embodied to have terminal elements for electrical connection to the battery cells. To this end, an adjacent submodule is contacted in each case by the terminal elements. For the purpose of contacting an external busbar or a cable, the module end plates have a further contacting point, which corresponds to the electrical contact. The electrical contact can be realized with a screw terminal or spring terminal, for example. In principle, the external busbar or the cable can also be permanently connected to the electrical contact, for example by soldering or welding.

In principle, the battery cells can be embodied in any desired manner. For example, the battery cells can be embodied as pouch cells or prismatic cells. The battery cells can be connected here to the intermediate element and/or to one another by welding methods, for example. The individual adjacent battery cells are in this case each electrically connected to one another in accordance with the arrangement in the stack. Each battery module is typically formed from battery cells of the same type. The battery cells are usually connected in series in the battery module.

In principle, the battery can have various combinations of individual battery modules to be able to supply a desired combination of voltage and current over a desired time period. In this case, battery voltages of 100 V or more are possible.

The vehicle can be any desired vehicle having an electric drive. In this case, the vehicles may be both vehicles that have exclusively an electric drive, usually referred to as electric vehicles, or vehicles that have a further drive, typically a conventional drive in the form of a combustion engine, in addition to an electric drive. The latter vehicles are often referred to as hybrid vehicles.

In an advantageous refinement of the invention, the module end plates and/or the at least one intermediate element are embodied as cooling elements of a battery cooling system. During operation, the battery cells heat up when charging and discharging. In this case, cooling is required to be able to supply the power of the battery steadily in a desired manner and to prevent damage to the battery.

The same applies for heating the battery. It may be necessary, particularly when starting a journey and/or at low ambient temperatures, to heat up the battery in order to be able to supply the power of the battery at any time in a desired manner and to prevent damage to the battery. The battery cooling system is preferably embodied for heating and cooling.

In an advantageous refinement of the invention, the at least one intermediate element has a connection element on both sides, by means of which the intermediate element is electrically coupled to adjacent battery cells, and the two connection elements are electrically conductively connected to one another. The connection elements therefore serve to connect a respective submodule to an intermediate element. The connection elements substantially correspond in terms of function to the terminal elements on the module end plates, wherein the battery module as a whole is contacted by means of the terminal elements and a submodule is contacted by means of the connection elements. The corresponding battery cells and connection elements are preferably electrically connected to one another by welding in order to provide a reliable electrical contact. A base plate of the intermediate element on which the connection elements are mounted can therefore be produced from an insulating material, in order to electrically separate submodules from one another.

In an advantageous refinement of the invention, the intermediate element has a through-connection, which electrically connects the two connection elements to one another. A passage is accordingly formed in the respective intermediate element, through which passage the through-connection is able to extend. The through-connection is preferably formed in the manner of a via, as is used in printed circuit boards. The through-connection accordingly extends, for example, from a connection element through the passage to the other connection element, and is electrically connected there to said other connection element, for example by soldering or welding. The through-connection can be embodied to be solid or in the manner of a sleeve.

In an advantageous refinement of the invention, the intermediate element has two intermediate plates, wherein each intermediate plate is coupled to an adjacent battery cell, and the two intermediate plates are electrically coupled. This allows the submodules to be provided as discrete structural units. The submodules as a whole can therefore be easily configured for variable, subsequent use. Battery modules can be easily formed by a combination of prefabricated submodules. The intermediate elements are therefore formed from the then adjacent intermediate plates when assembling the individual submodules to form the battery module. Moreover, the submodules can be embodied to be inherently stable by virtue of the fact that the intermediate plates are fixedly connected to one another and battery cells are held therebetween. The submodules between two connection plates serve here as intermediate modules of a battery module. The same applies for the connection of an intermediate plate to a module end plate. By combining a module end plate and an intermediate plate, with battery cells held accordingly therebetween, it is likewise possible to form preconfigured submodules, which, as terminal modules, allow an electrical connection of the battery module as a whole. The intermediate plates are coupled, for example, as described above with reference to the intermediate element.

In an advantageous refinement of the invention, the two intermediate plates can be mechanically connected to one another using a plug connection. This allows a particularly simple mechanical combination of submodules to form the battery module.

In an advantageous refinement of the invention, the two intermediate plates are embodied with a corresponding combination of plug and socket, and the two intermediate plates can be electrically coupled by means of the plug and the socket. In this case, the plug and socket form an electrical connection. An electrical connection of adjacent submodules to the two intermediate plates can be produced accordingly using just one electrical transition, namely the contact between the plug and socket. The production of the electrical connection is particularly easily possible due to the plug connection.

In a further advantageous refinement of the invention, the plug connection is embodied integrally as a plug and socket, with the result that both a mechanical connection and an electrical coupling of the two intermediate plates can be achieved by means of the plug connection.

In an advantageous refinement of the invention, the battery has a battery housing in which the battery modules are arranged, and the module end plates and/or the at least one intermediate element are held on the battery housing. As a result, the stability of the battery modules is improved further. The stability of the individual battery modules and hence also the reliability and stability of the battery as a whole increases with the number of intermediate elements held on the housing.

BRIEF DESCRIPTION OF THE DRAWINGS

Below, the invention will be discussed by way of example with reference to the appended drawings and on the basis of preferred exemplary embodiments, wherein the features presented below may in each case individually or combinatively constitute an aspect of the invention.

In the drawings.

DETAILED DESCRIPTION OF THE INVENTION

Figure 1:
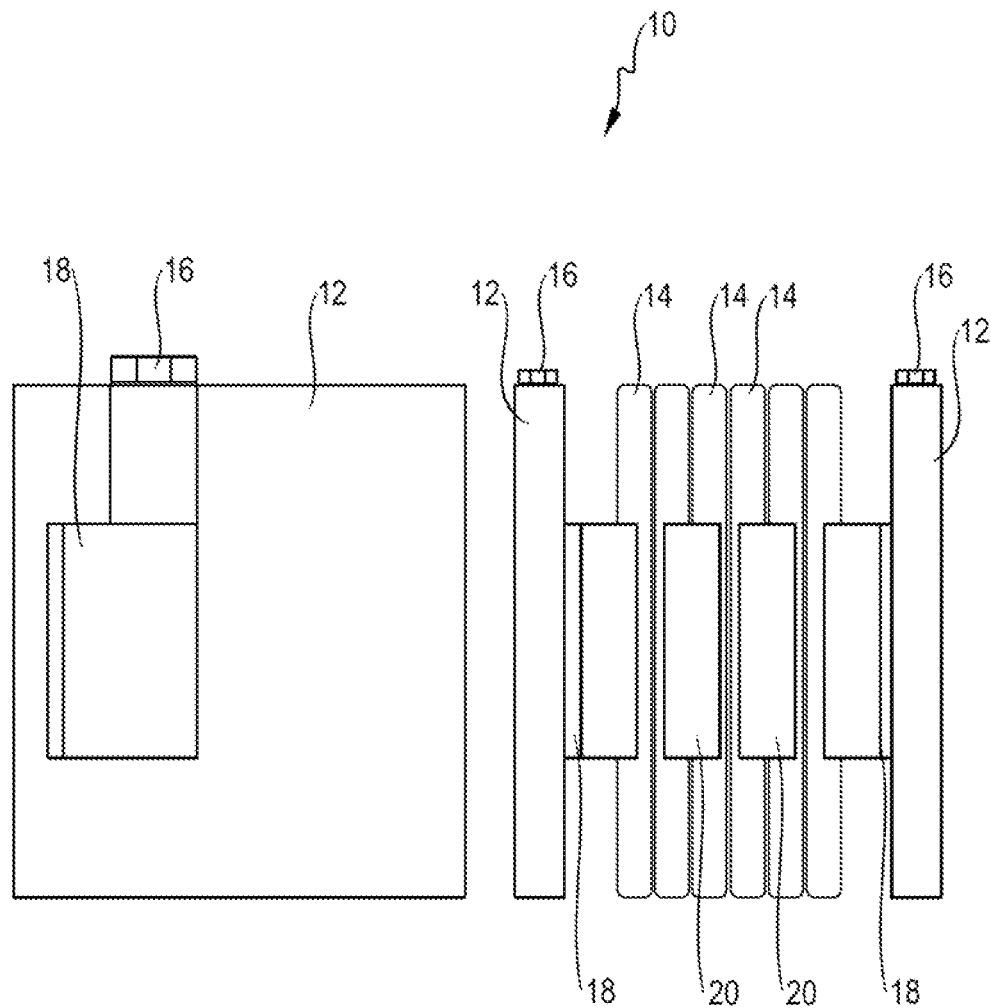
FIG. 1 shows, in a front and side view, a schematic illustration of a battery module from the prior art in accordance with a first embodiment.
Figure 2:
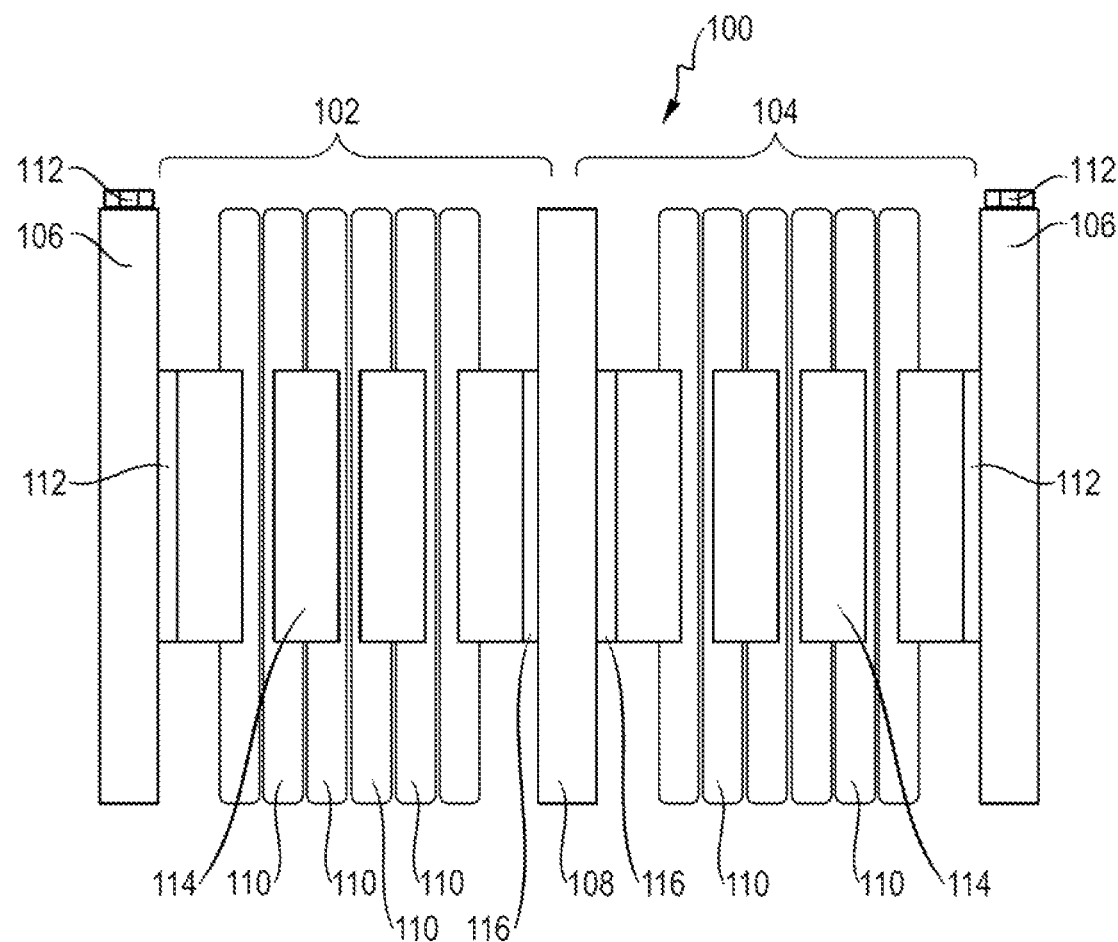
FIG. 2 shows, in a side view, a schematic illustration of a battery module having two submodules, which are isolated using an intermediate element, in accordance with a second, preferred embodiment.
Figure 3:
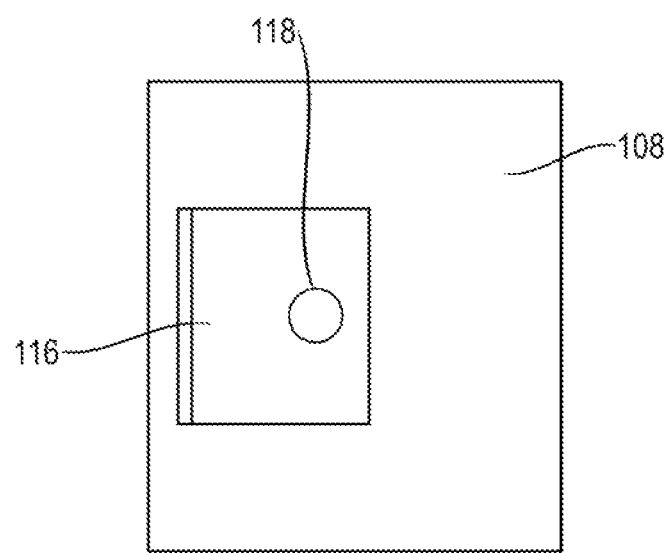
FIG. 3 shows, in a front view, a schematic illustration of the intermediate element from FIG. 2 having a connection element and a through-connection.

FIGS. 2 and 3 depict a battery module 100 according to aspects of the invention in accordance with a second, preferred embodiment of the invention.

The battery module 100 comprises a first and a second submodule 102, 104 having a plurality of individual battery cells 110, which are stacked in the two submodules 102, 104. In principle, the battery cells 110 can be embodied in any desired manner. In accordance with the second embodiment, the battery cells 110 are embodied as pouch cells or prismatic cells. The individual adjacent battery cells 110 are in this case each electrically connected to one another in accordance with the arrangement in the stack. The battery module 100 is formed from battery cells 110 of the same type, which are connected in series in the battery module 100.

The battery module 100 further comprises two module end plates 106 and an intermediate element 108 between which the battery cells 110 are held. The battery cells 110 of the first and second submodule 102, 104 are in this case each held between one of the module end plates 106 and the intermediate element 108. The two module end plates 106 each have a screw terminal 107 as an electrical contact for connection of the battery module 100. The battery module 100 contacts an external busbar or cable (not illustrated) by means of the screw terminals 107.

The battery cells 110 in the battery module 100 are electrically coupled by means of terminal elements 112, coupling elements 114 and connection elements 116. In this case, a terminal element 112 is formed on each module end plate 106 and the intermediate element 108 has a connection element 116 on both sides.

The terminal elements 112 respectively contact an adjacent submodule 102, 104 by virtue of the fact that they contact the respective adjacent battery cell 110 of the respective submodule 102, 104. The coupling elements 114 produce an electrical connection between adjacent battery cells 110 within the two submodules 102, 104. The connection elements 116 respectively contact an adjacent submodule 102, 104 by virtue of the fact that they contact the respective adjacent battery cell 110 of the respective submodule 102, 104. The battery cells 110 are each connected to the terminal element 112, to the coupling element 114 and to the connection element 116 by welding methods.

In this exemplary embodiment, a module end plate 106 together with the intermediate element 108 therefore serve in each case for connection of a respective submodule 102, 104.

The intermediate element 108 of the second embodiment has a through-connection 118, which electrically connects the two connection elements 116 to one another. A passage (not distinctly visible) is accordingly formed in the intermediate element 108, through which passage the through-connection 118 extends. The through-connection 118 is formed as a sleeve in the manner of a via, as is used in a printed circuit board, and is electrically connected to the two connection elements 116.

FIGS. 4 to 8 relate to a battery module 100 according to aspects of the invention in accordance with a third embodiment of the invention. The battery modules 100 of the second and third embodiment are largely identical. Features of the battery module 100 of the third embodiment, which are not otherwise described, can accordingly be realized in accordance with the battery module 100 of the second embodiment, where necessary.

Figure 4:
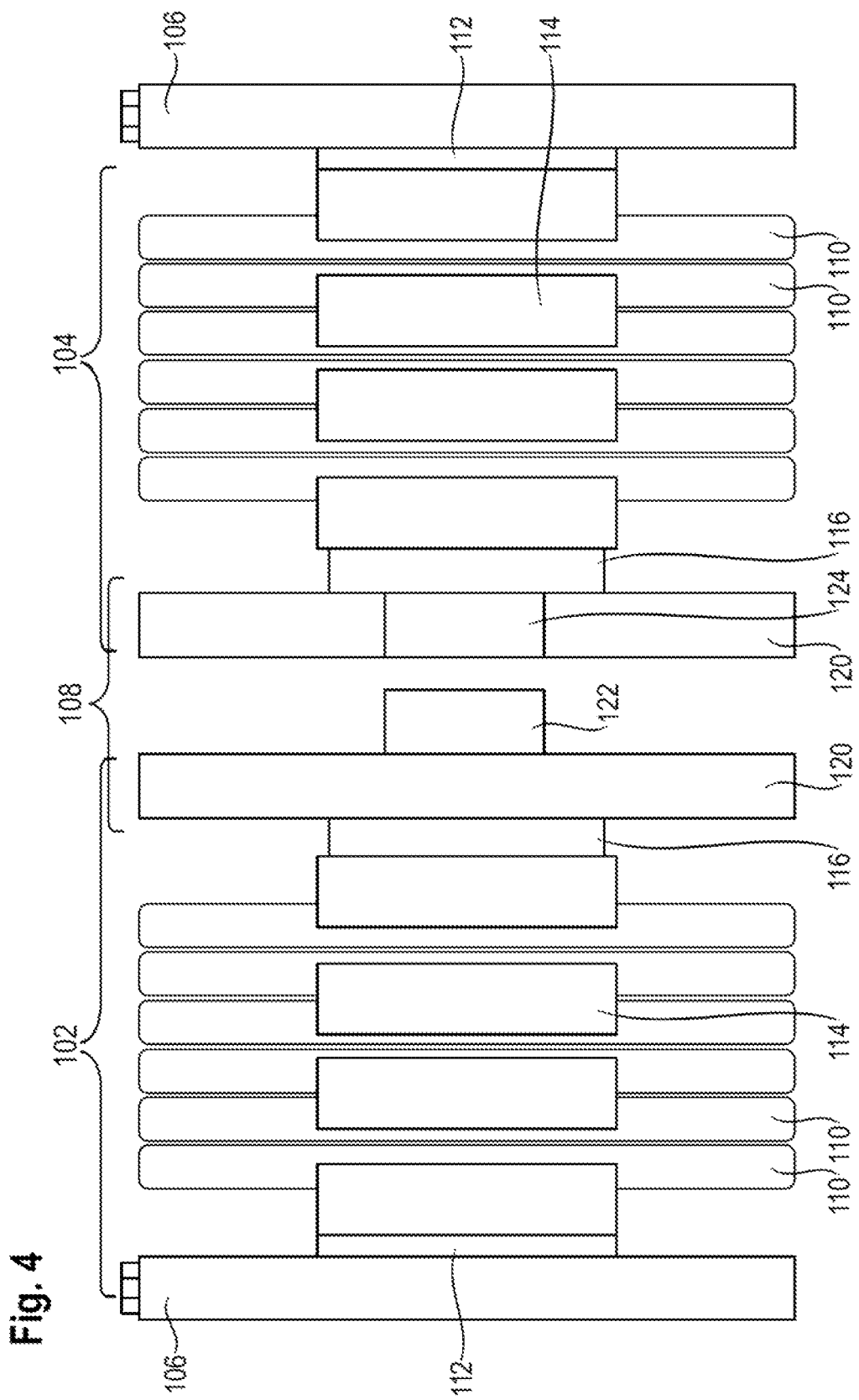
FIG. 4 shows, in a side view, a schematic illustration of a battery module having two submodules, which are isolated using an intermediate element having two intermediate plates, in accordance with a third, preferred embodiment.

As illustrated in FIG. 4, the battery module 100 of the third embodiment comprises a first and a second submodule 102, 104 having a plurality of individual battery cells 110, which are stacked in the two submodules 102, 104. The battery cells 110 are embodied as pouch cells of the same type and are electrically interconnected in series in the battery module 100.

The battery module 100 further comprises two module end plates 106 and an intermediate element 108 between which the battery cells 110 are held. The intermediate element 108 of the third embodiment has two intermediate plates 120, wherein each intermediate plate 120 is electrically coupled to an adjacent battery cell 110, as has been described with reference to the connection element 116 of the second embodiment. The submodules 102, 104 are accordingly provided in each case with an intermediate plate 120 and a module end plate 106 as discrete structural units. Moreover, the structural units formed in this way are inherently stable, since the respective module end plate 106 and the intermediate plate 120 are fixedly connected to one another in a manner not shown, and the battery cells 110 located between said module end plate and intermediate plate are held therebetween.

The two submodules 102, 104 are mechanically connected to one another by means of the two intermediate plates 120 using a plug connection (not illustrated in detail).

Figure 5:
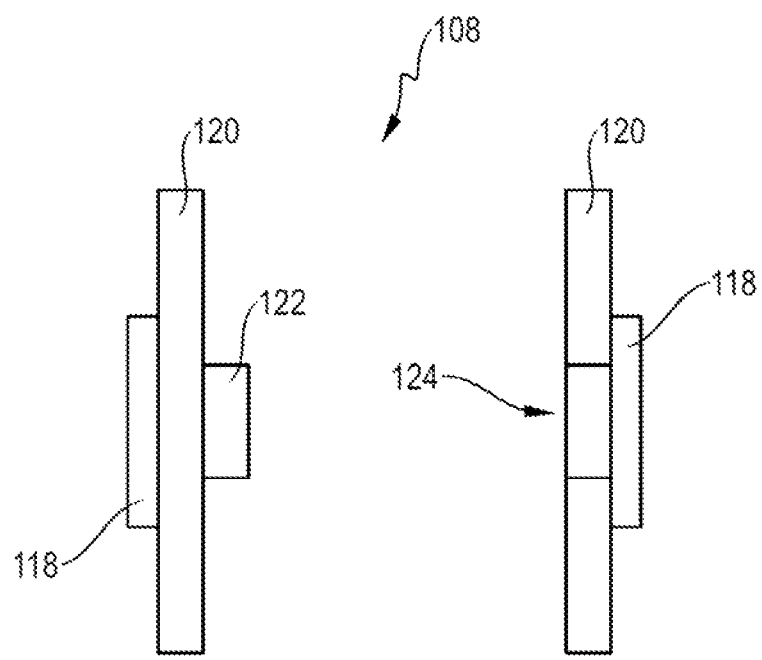
FIG. 5 shows, in a side view, a schematic illustration of the intermediate element from FIG. 4 having a connection element and a plug and a socket for connecting the two intermediate plates.
Figure 6:
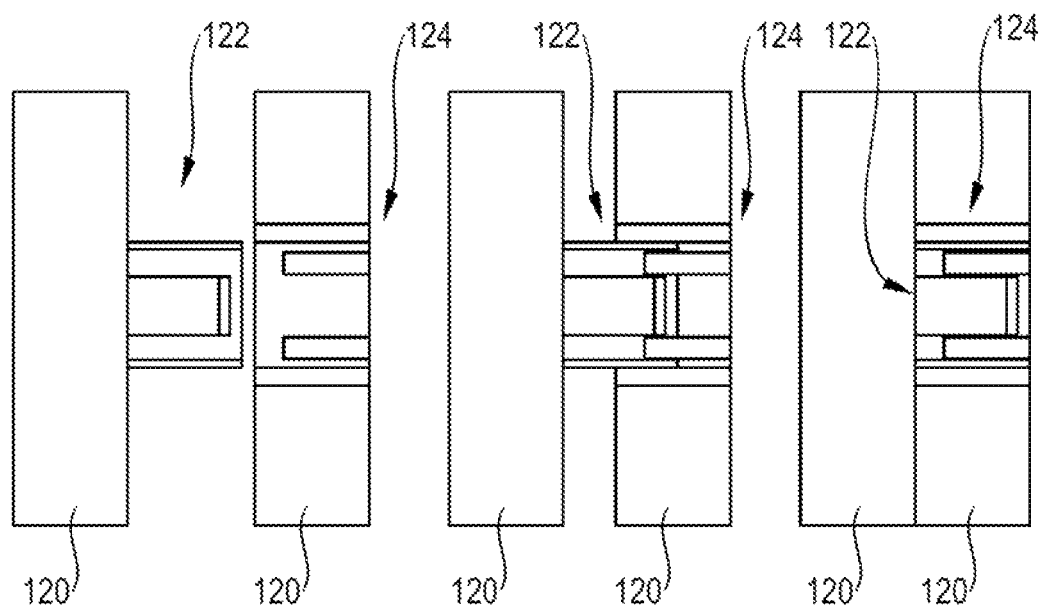
FIG. 6 shows, in a side view, a detail of the intermediate element from FIG. 4, having the plug and the socket in the connected state, in the non-connected state and in an intermediate state.

Furthermore, in the connected state, the two submodules 102, 104 are electrically coupled by means of the two intermediate plates 120. To this end, the two intermediate plates 120, as shown in detail in FIGS. 5 and 6, are embodied to have a corresponding combination of plug 122 and socket 124.

Figure 7:
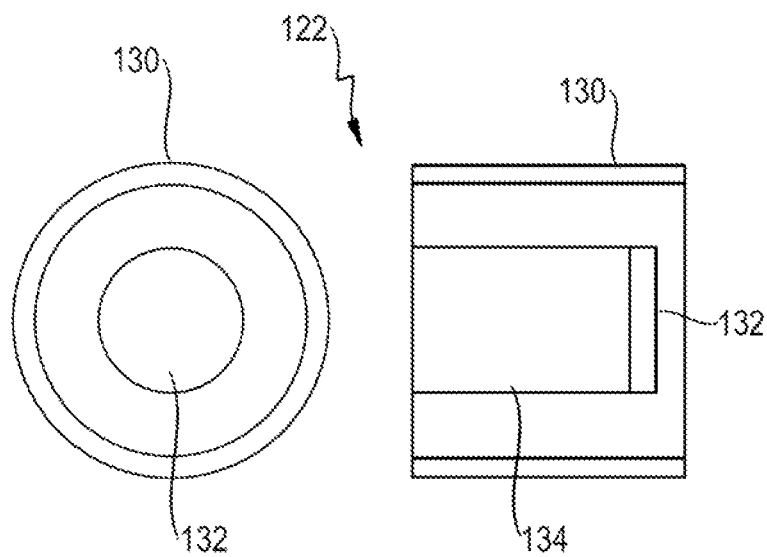
FIG. 7 shows, in a front and side sectional view, a detail of the plug from FIG. 6.
Figure 8:
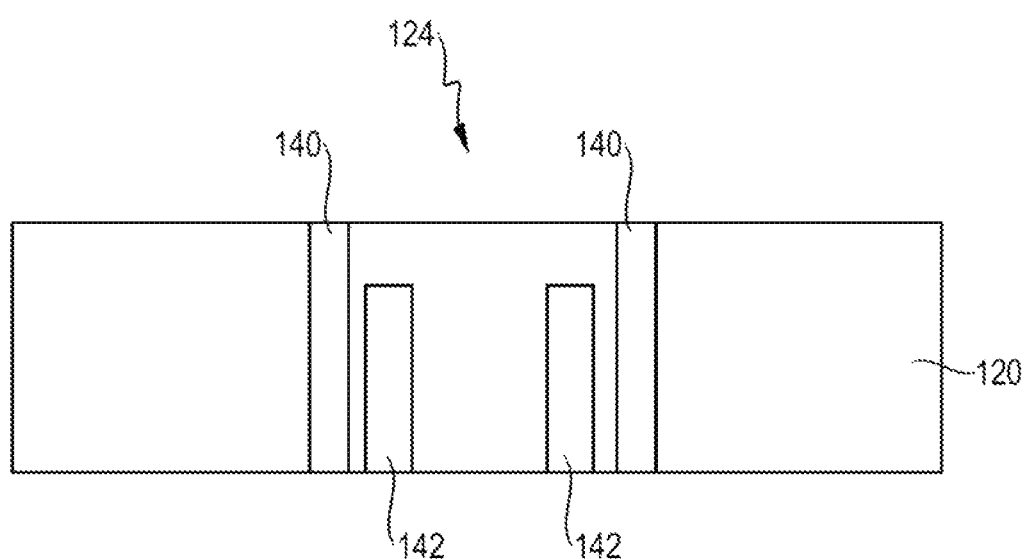
FIG. 8 shows, as a sectional view, a detail of the socket from FIG. 6 in the intermediate plate.

The plug 122 is shown alone in FIG. 7 and comprises an insulating sleeve 130 and, arranged in said insulating sleeve, a pin element 134 having a contact tip 132. The contact tip 132 is electrically connected to the connection element 116 of the corresponding intermediate plate 120. The socket 124 is illustrated in FIG. 8 in the corresponding intermediate plate 120 and comprises an insulating element 140, which insulates against the corresponding intermediate plate 120 and is embodied in the shape of a sleeve, as well as a contact sleeve 142 arranged in said socket. The contact sleeve 142 is electrically connected to the connection element 116 of the corresponding intermediate plate 120.

The remainder of the design of the battery module 100 of the third embodiment is as described above with reference to the second embodiment.

The battery cells 110 of the first and second submodule 102, 104 are in this case each held between a module end plate 106 and an intermediate plate 120 of the intermediate element 108. The two module end plates 106 each have a screw terminal 107 as an electrical contact for connection of the battery module 100. The battery module 100 contacts an external busbar or cable (not illustrated) by means of the screw terminals 107.

The battery cells 110 in the battery module 100 are electrically coupled by means of the terminal elements 112, coupling elements 114 and the connection elements 116. In this case, a terminal element 112 is formed on each module end plate 106 and each intermediate plate 120 of the intermediate element 108 has a connection element 116 on one side, as has already been described above.

The terminal elements 112 each contact an adjacent battery cell 110 of the respective submodule 102, 104. The coupling elements 114 produce an electrical connection between adjacent battery cells 110 within the two submodules 102, 104. The connection elements 116 each contact an adjacent battery cell 110 of the respective submodule 102. The battery cells 110 are each connected to the terminal element 112, to the coupling element 114 and to the connection element 116 by welding methods.

In this exemplary embodiment, a module end plate 106 together with an intermediate plate 120 of the intermediate element 108 therefore serve in each case for connection of a respective submodule 102, 104.

Figure 9:
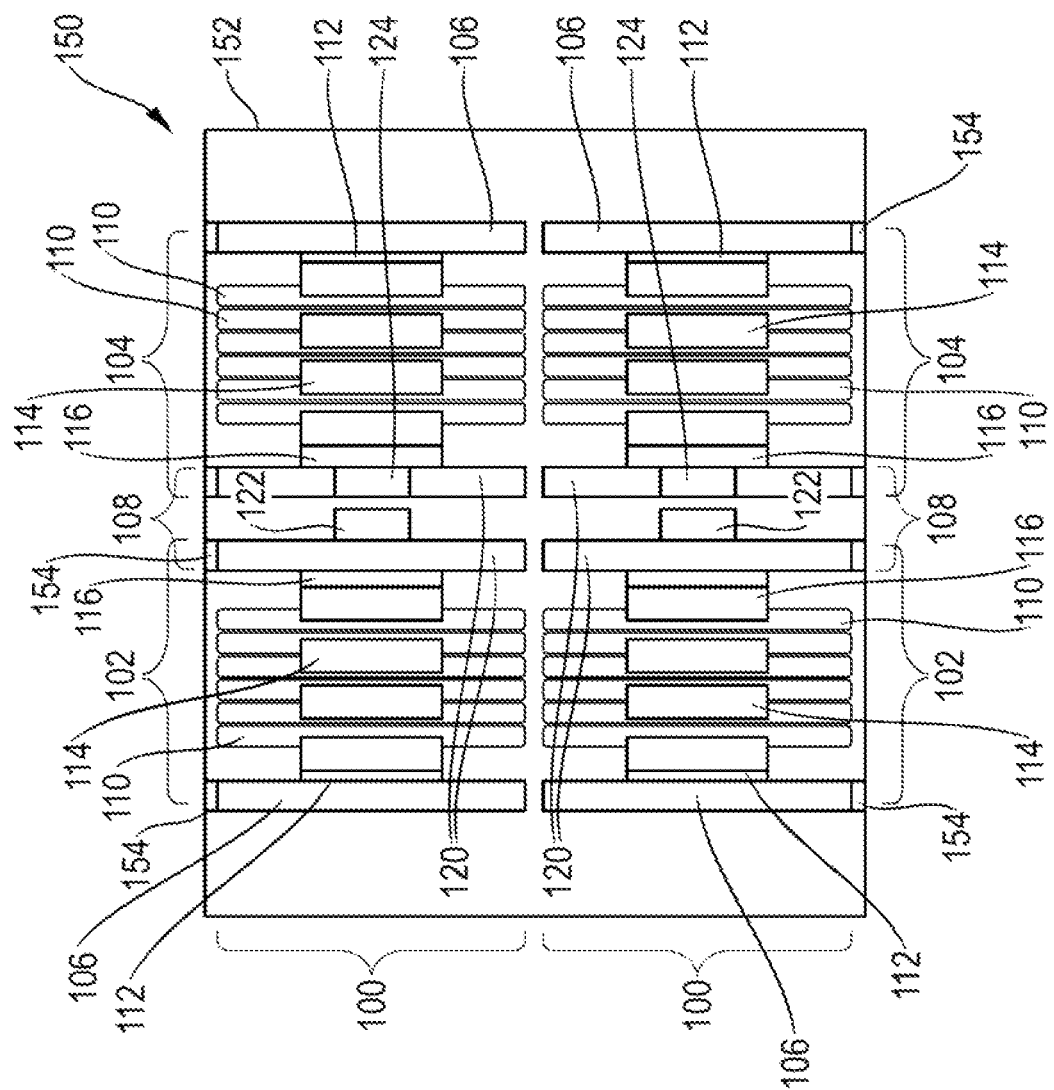
FIG. 9 shows, in a side view, a schematic illustration of a battery having two battery modules from FIG. 4 in accordance with a fourth embodiment.

FIG. 9 shows a battery 150 in accordance with a fourth embodiment of the invention. The battery 150 comprises two battery modules 100, which are illustrated in FIG. 4 in accordance with the third embodiment. In principle, the battery modules 100 of the second embodiment can also be used instead of the battery modules 100 of the third embodiment.

The battery 150 is embodied to drive a vehicle. The vehicle is a vehicle having an electric drive, for example an electric vehicle or a hybrid vehicle.

The battery 150 has a battery housing 152 in which the two battery modules 100 are arranged. The battery modules 100 are held in the battery housing 152 using mounts 154, which hold the module end plates 106 and the intermediate plates 120 of the intermediate element 108, as is schematically illustrated in FIG. 9. The connected battery modules 100 are rightly held in the battery housing 152, with the result that the mounts 154 for the intermediate plates 120 are accordingly arranged for the connected intermediate plates 120.

Cell frames and taps for measuring the cell voltage that are necessary in pouch cells, for example, are not illustrated in the figures. The battery 150 is likewise usually embodied having a battery management system (BMS), which is likewise not illustrated in the figures.

What is claimed is:

1. A battery module for a battery for driving a vehicle, said battery module comprising:
    a plurality of individual stackable battery cells and two module end plates, wherein:
        the battery cells are stacked and held between the two module end plates,
        the two module end plates include a respective terminal element for electrical connection to the battery cells and a respective electrical contact for electrical connection to an external busbar or cable,
        the battery cells are electrically coupled to one another,
        the two module end plates are electrically coupled to the battery cells, and
        each module end plate has an electrical contact for connection to the battery module; and
    a plurality of intermediate elements formed of an insulating material and coupled to two respective adjacent sets of battery cells, wherein:
    each intermediate element divides the two respective adjacent sets of battery cells of the battery module into one of two respective submodules,
    each intermediate element electrically connects the two respective submodules, and
    each intermediate element includes two intermediate plates such that each of the two intermediate plates are electrically coupled to one of the two respective sets of adjacent battery cells of the two respective submodules by a through-connection formed as a via passing through the two intermediate plates.

2. The battery module as claimed in claim 1, wherein the two module end plates or the plurality of intermediate elements are embodied as cooling elements of a battery cooling system.

3. The battery module as claimed in claim 1, wherein each intermediate element has a connection element on both sides, by which each intermediate element is electrically coupled to the adjacent battery cells, and the two connection elements are electrically conductively connected to one another.

4. The battery module as claimed in claim 3, wherein the two intermediate plates are configured to be mechanically connected to one another using a plug connection.

5. The battery module as claimed in claim 3, wherein the two intermediate plates are embodied with a corresponding combination of plug and socket, and the two intermediate plates are configured to be electrically coupled by the plug and the socket.

6. The battery as claimed in claim 1, wherein the battery has a battery housing in which a plurality of battery modules of claim 1 are arranged, and the two module end plates or the plurality of intermediate elements are held on the battery housing.

7. A vehicle comprising:
an electric drive connected to a battery,
the battery having a plurality of battery modules, each battery module comprising:
 (i) a plurality of individual stackable battery cells and two module end plates,
wherein:
 the battery cells are stacked and held between the two module end plates,
 the two module end plates include a respective terminal element for electrical connection to the battery cells and a respective electrical contact for electrical connection to an external busbar or cable,
 the battery cells are electrically coupled to one another, the two module end plates are electrically coupled to the battery cells, and
 each module end plate has an electrical contact for connection to the battery module; and
 (ii) a plurality of intermediate elements formed of an insulating material and coupled to two respective adjacent sets of battery cells, wherein;
each intermediate element divides the two respective adjacent sets of battery cells of the battery module into a one of two respective submodules,
each intermediate element electrically connects the two respective submodules, and
each intermediate element includes two intermediate plates such that each of the two intermediate cooling plates are electrically coupled to one of the two respective sets of adjacent battery cells of the two respective submodules by a through-connection formed as a via passing through the two intermediate plates.

\* \* \* \* \*